(12) United States Patent
Findeis et al.

(10) Patent No.: US 11,305,613 B2
(45) Date of Patent: Apr. 19, 2022

(54) CARRIER DEVICE

(71) Applicant: Eberspächer Climate Control Systems GmbH & Co. KG, Esslingen (DE)

(72) Inventors: Thorsten Findeis, Albershausen (DE); Hans Jensen, Dettingen unter Teck (DE); Uwe Grotstollen, Esslingen (DE); Johannes Eger, Esslingen (DE)

(73) Assignee: EBERSPÄCHER CLIMATE CONTROL SYSTEMS GMBH, Esslingen am Neckar (DE)

( * ) Notice: Subject to any disclaimer, the term of this patent is extended or adjusted under 35 U.S.C. 154(b) by 646 days.

(21) Appl. No.: 16/025,333

(22) Filed: Jul. 2, 2018

(65) Prior Publication Data

US 2019/0001786 A1      Jan. 3, 2019

(30) Foreign Application Priority Data

Jul. 3, 2017   (DE) ..................... 10 2017 114 762.4

(51) Int. Cl.
  *B60H 1/22*   (2006.01)
  *F24H 9/06*   (2006.01)
  *F24H 3/02*   (2022.01)

(52) U.S. Cl.
  CPC ......... *B60H 1/2212* (2013.01); *B60H 1/2209* (2013.01); *F24H 3/025* (2013.01); *F24H 9/06* (2013.01); *B60H 2001/2237* (2013.01); *B60H 2001/2271* (2013.01);

(Continued)

(58) Field of Classification Search
  CPC ................................................... B60H 1/2209
  See application file for complete search history.

(56) References Cited

U.S. PATENT DOCUMENTS

2003/0070849 A1 *   4/2003   Whittaker ............ B60H 1/3226
                                              180/68.2
2004/0231832 A1 *  11/2004  Schlecht .............. B60H 1/2212
                                              165/202

(Continued)

FOREIGN PATENT DOCUMENTS

CN        104924873 A      9/2015
DE     101 07 909 A1      9/2002

(Continued)

OTHER PUBLICATIONS

Machine translation of EP1213547B1, https://patents.google.com/patent/EP1213547B1/en, retrieved Jan. 30, 2021 (Year: 2021).*

*Primary Examiner* — Avinash A Savani
*Assistant Examiner* — Deepak A Deean
(74) *Attorney, Agent, or Firm* — McGlew and Tuttle, P.C.

(57) ABSTRACT

A carrier device for mounting a preferably fuel-operated heater (34) on a vehicle. The carrier device includes a mounting area (20) for mounting the carrier device (14) on a vehicle and a carrying area (152) for mounting a heater (34) on the carrier device (14). A combustion air line area (52) is provided for sending combustion air to a combustion air inlet (55) of a heater (34), or/and a heat transfer medium line area (60) is provided for sending heat transfer medium flowing in a heat transfer medium circuit (176) of a vehicle through the carrier device (14) or/and to or from a heat exchanger area (38) of the vehicle heater (34).

14 Claims, 6 Drawing Sheets

(52) U.S. Cl.
CPC ............... *B60H 2001/2278* (2013.01); *B60H 2001/2281* (2013.01); *F23D 2900/21002* (2013.01)

(56) References Cited

U.S. PATENT DOCUMENTS

| | | | |
|---|---|---|---|
| 2015/0165871 A1* | 6/2015 | Miller | B60H 1/2209 237/28 |
| 2017/0227254 A1* | 8/2017 | Ragg | F24H 1/20 |
| 2018/0304739 A1* | 10/2018 | Eberspach | F01P 3/18 |

FOREIGN PATENT DOCUMENTS

| | | |
|---|---|---|
| DE | 10 2007 022 720 A1 | 11/2008 |
| DE | 102 10 034 B4 | 10/2009 |
| EP | 1 213 547 A2 | 6/2002 |
| EP | 1 270 288 A2 | 1/2003 |

* cited by examiner

CARRIER DEVICE

CROSS REFERENCE TO RELATED APPLICATIONS

This application claims the benefit of priority under 35 U.S.C. § 119 of German Application 10 2017 114 762.4, filed Jul. 3, 2017, the entire contents of which are incorporated herein by reference.

FIELD OF THE INVENTION

The present invention pertains to a carrier device, by means of which a preferably fuel-operated heater can be mounted on a vehicle.

BACKGROUND OF THE INVENTION

To integrate heaters that can be used, for example, as parking heaters or/and auxiliary heaters in vehicles, it is known that, in general, carrier devices bent from sheet metal material can be used. These comprise a mounting area, with which these can be mounted on a vehicle. for example, by a screw connection. A heater may be mounted in a carrying area of such a carrier device, for example, in the area of a heater housing thereof, e.g., by a screw connection on the carrier device. It is necessary in this connection that the different connections formed on such a heater, for example, for supplying combustion air, for supplying and removing a heat transfer medium to and from a heat exchanger area of the heater and for removing combustion waste gases generated in a burner area of the heater, be exposed in order to be able to connect lines carrying these media both at the time of positioning the carrier device in relation to the vehicle and at the time of positioning the heater in relation to the carrier device.

SUMMARY OF THE INVENTION

An object of the present invention is to provide a carrier device for mounting a preferably fuel-operated heater on a vehicle, which carrier device makes possible, when mounted in a stable manner, a connection of the heater to lines carrying different media to and from the heater, which connection can be established in a simple and reliable manner.

This object is accomplished according to the present invention by a carrier device for mounting a preferably fuel-operated heater on a vehicle, comprising a mounting area for mounting the carrier device on a vehicle and a carrying area for mounting a heater on a carrier device and further comprising at least one fluid line area for conveying fluid to or from the heater, the at least one fluid line area comprising a combustion air line area for sending combustion air to a combustion air inlet of a vehicle or/and a heat transfer medium line area for sending heat transfer medium flowing in a heat transfer medium circuit of a vehicle through the carrier device or/and to or from a heat exchanger area of the vehicle heater.

Various line areas, especially a line area for guiding combustion air or/and a line area for guiding the heat transfer medium to be heated in a heater, are integrated in the carrier device in the carrier device configured according to the present invention. It thus becomes possible first to combine a heater with such a carrier device into one assembly unit and to establish in the process the mounting of the heater at the different line areas provided at the carrier device. The assembly unit thus configured can then be integrated into a vehicle and mounted with the mounting area, for example, on a frame of the vehicle. The mounting on the vehicle can be carried out such that an optimal installation position is obtained for the heater, without having to bear in mind that different connections formed on the heater are still freely accessible. In particular, the connection especially to a heat transfer medium circuit provided in the vehicle is carried out only later.

The integration of an additional functionality in the carrier device according to the present invention can be achieved by the combustion air line area comprising a combustion air connection area to be connected to the combustion air inlet of the heater and an exhaust muffler area upstream of the combustion air connection area.

In an especially advantageous embodiment of the carrier device, the heat transfer medium line area may comprise: a first line area with a first heat transfer medium circuit connection area to be connected to the heat transfer medium circuit and a first on-off valve connection area to be connected to an on-off valve; or/and a second line area with a second heat transfer medium circuit connection area to be connected to the heat transfer medium circuit and a second on-off valve connection area to be connected to the on-off valve; or/and a third line area with a third heat transfer medium circuit connection area to be connected to the heat transfer medium circuit and with a third on-off valve connection area to be connected to the on-off valve; or/and a fourth line area with a first heat exchanger area connection area to be connected to the heat exchanger area and with a fourth on-off valve connection area to be connected to the on-off valve; or/and a fifth line area with a second heat exchanger area connection area to be connected to the heat exchanger area and with a fourth heat transfer medium circuit connection area to be connected to the heat transfer medium circuit; or/and a sixth line area that is in connection with the first line area with a fifth heat transfer medium circuit connection area to be connected to the heat transfer medium circuit.

To make it possible to obtain a configuration of the carrier device that van be embodied in a simple manner despite the comparatively complex structure, this carrier device may comprise at least two carrier device modules to be connected to one another, the mounting area being provided on a first of the carrier device modules and the carrying area being provided on the first carrier device module or/and on a second of the carrier device modules.

It is proposed for a cost-effective configuration, which can nevertheless be embodied in a stable configuration, that at least one carrier device nodule be built at least partially and preferably essentially completely from a plastic material. Since the liquid heat transfer medium circulating especially in a heat transfer medium circuit of a vehicle, i.e., the cooling liquid of an internal combustion engine of such a vehicle, will not generally exceed temperatures of about 120° C., there is no risk of overheating of the material of which the carrier device is made.

The combustion air feed line area may be provided, for example, at the second carrier device module.

To guarantee a distribution of the line areas provided at the carrier device among the different carrier device modules for a simple configuration, it is proposed that the first line area or/and the third line area or/and the fourth line area or/and the fifth line area or/and the sixth line area be provided at the first carrier device module.

The second line area may, in turn, be provided at the second carrier device module.

It is proposed for a compact construction that the first carrier device module and the second carrier device module enclose a heater mounting space.

If the carrying area comprises at least one heat exchanger area connection area of the heat transfer medium line area or/and a combustion air connection area of the combustion area line area, these connection areas may assume an additional functionality for carrying the heater in a stable manner. As an alternative or in addition, the heater may, of course, be permanently connected to the carrier device, especially with one or more carrier device modules, by fastening elements, for example, screws, rivets or the like.

The present invention further pertains to a heater carrier device assembly unit for a vehicle, comprising a preferably fuel-operated heater carried on a carrier device configured according to the present invention.

To make it possible to control the supply and removal of heat transfer medium to and from the heater or the carrier device in a specific manner, it is proposed that an on-off valve be connected to at least one on-off valve connection area of the heat transfer medium line area.

Provisions may be made here in connection with the above-described configuration of the carrier device for the on-off valve to be connected to the first on-off valve connection area, to the second on-off valve connection area and to the third on-off valve connection area, or/and for the on-off valve to be connected to the first heat exchanger area connection area by means of a preferably flexible line connection.

To integrate an additional functionality in the heater carrier device assembly unit according to the present invention, it is proposed that the line connection comprise a heat transfer medium pump.

To remove the waste gases generated in the combustion area in a burner area of a heater, an exhaust system connected to a waste gas outlet of the heater may be carried on the carrier device. Since such waste gases may have a temperature in the range of several 100° C., it is advantageous to provide a separately configured and correspondingly heat-resistant exhaust system and to integrate it as such a separate assembly unit in the heater carrier device assembly unit.

The present invention further pertains to a heating system for a vehicle, comprising a heat transfer medium circuit with at least one heating heat exchanger or/and with at least one drive unit, preferably internal combustion engine, and a heater carrier device assembly unit configured according to the present invention.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
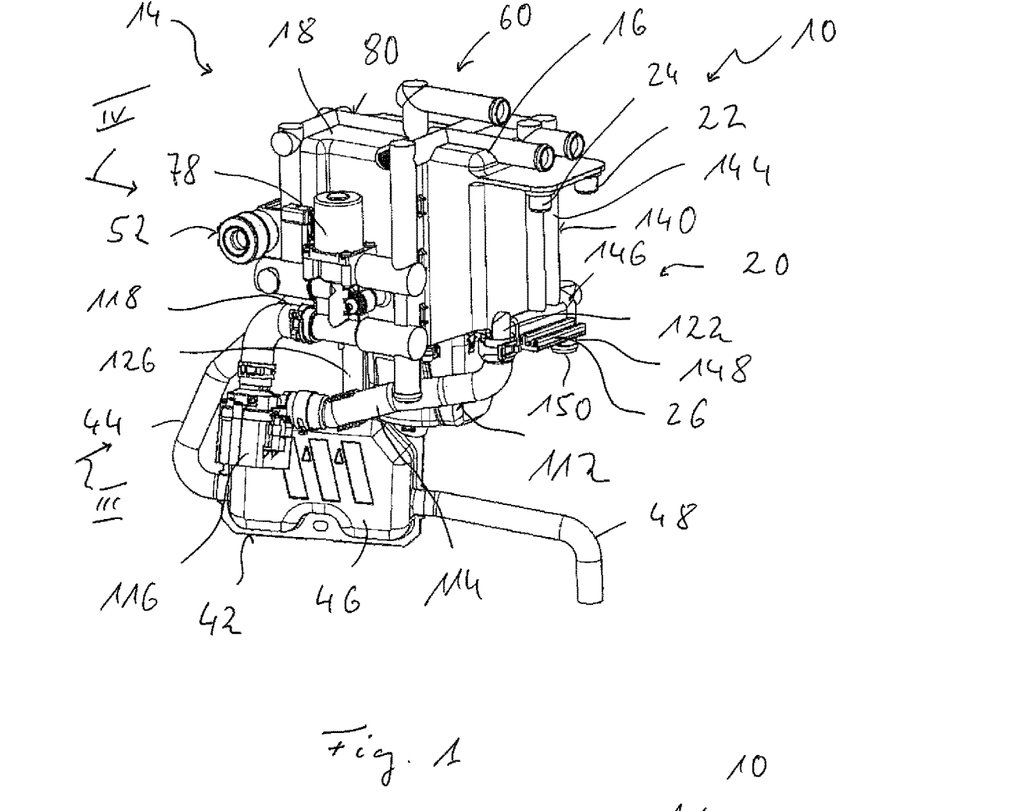
FIG. 1 is a perspective view of a heater carrier device assembly unit.
Figure 2:
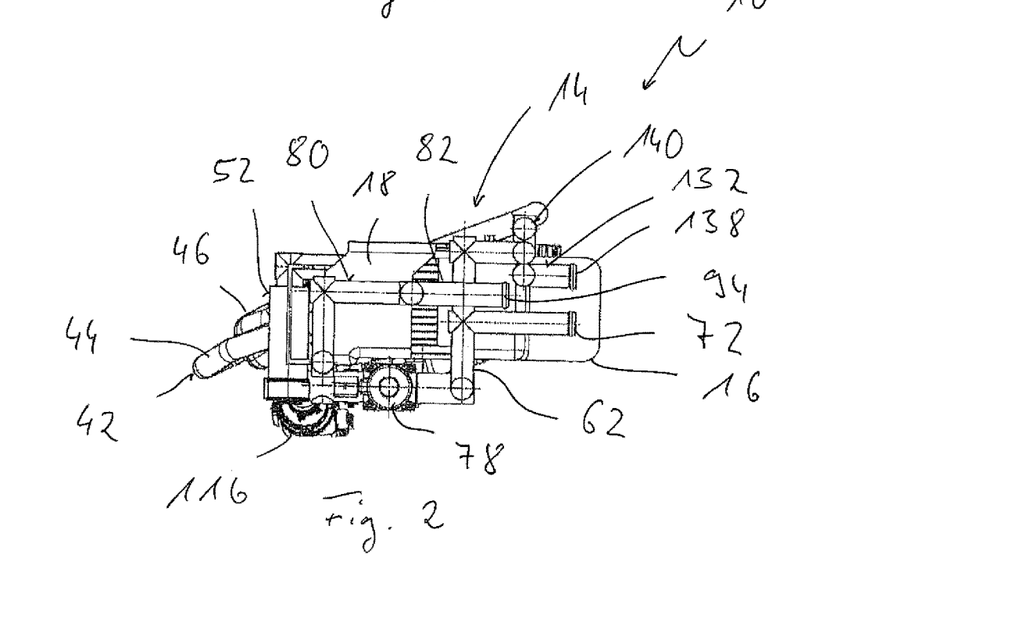
FIG. 2 is a view showing the heater carrier device assembly unit according to FIG. 1, viewed in the viewing direction II in FIG. 1.
Figure 3:
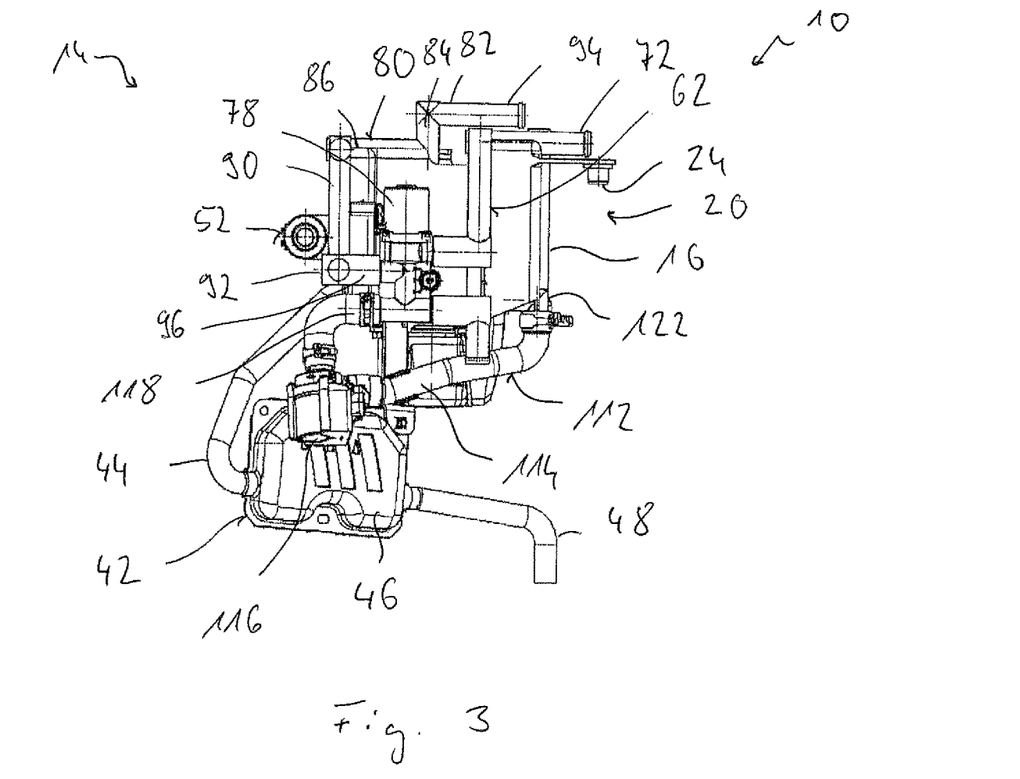
FIG. 3 is a view showing the heater carrier device assembly unit according to FIG. 1, viewed in the viewing direction III in FIG. 1.
Figure 4:
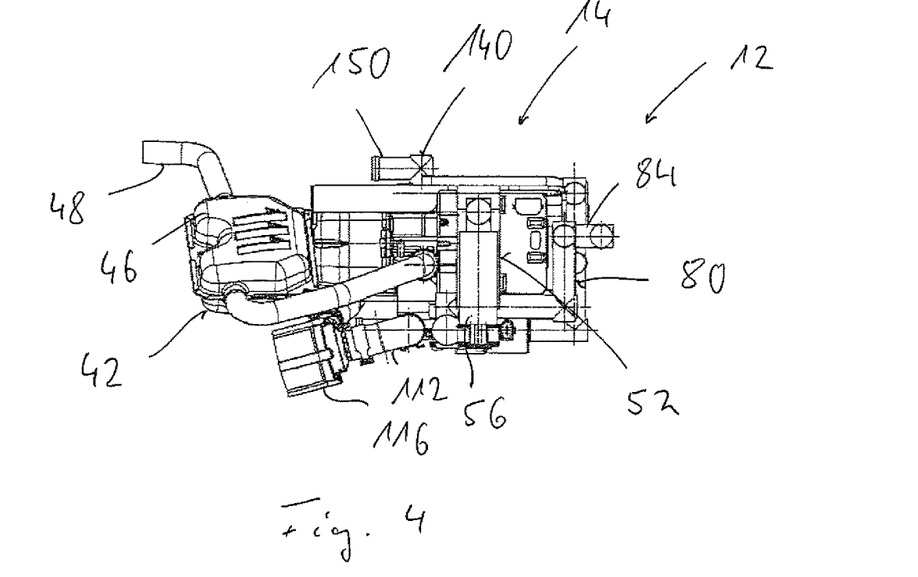
FIG. 4 is a view showing the heater carrier device assembly unit according to FIG. 1, viewed in the viewing direction IV in FIG. 1.
Figures 5, 6:
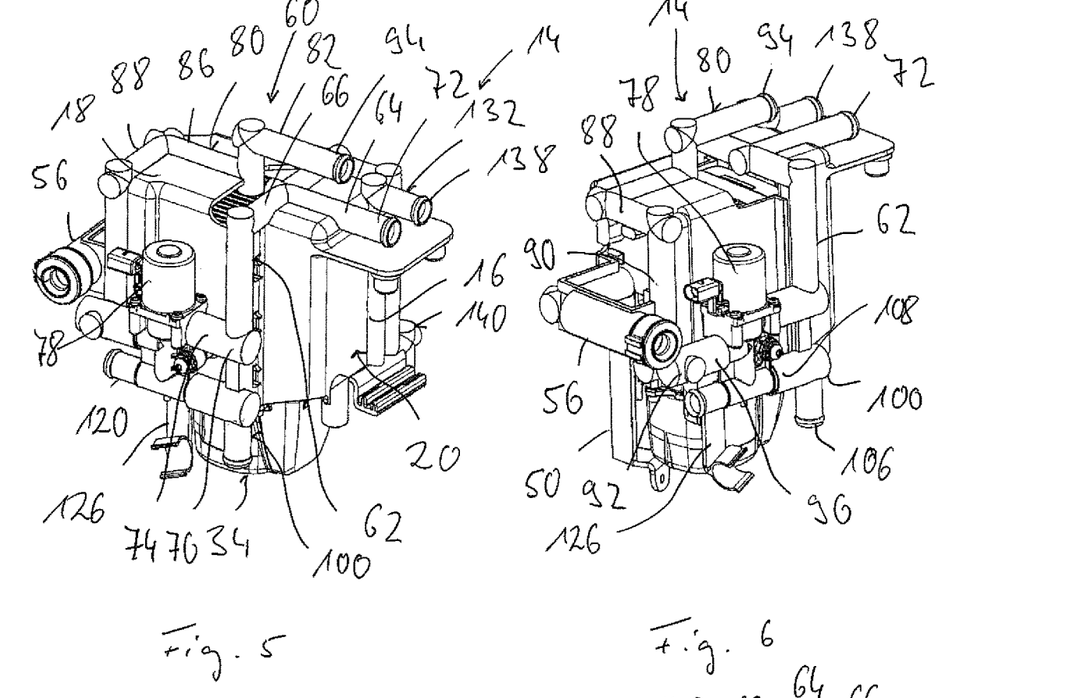
FIG. 5 is a perspective view showing parts of the heater carrier device assembly unit according to FIG. 1.
FIG. 6 is another perspective view showing parts of the heater carrier device assembly unit according to FIG. 1.
Figure 7:
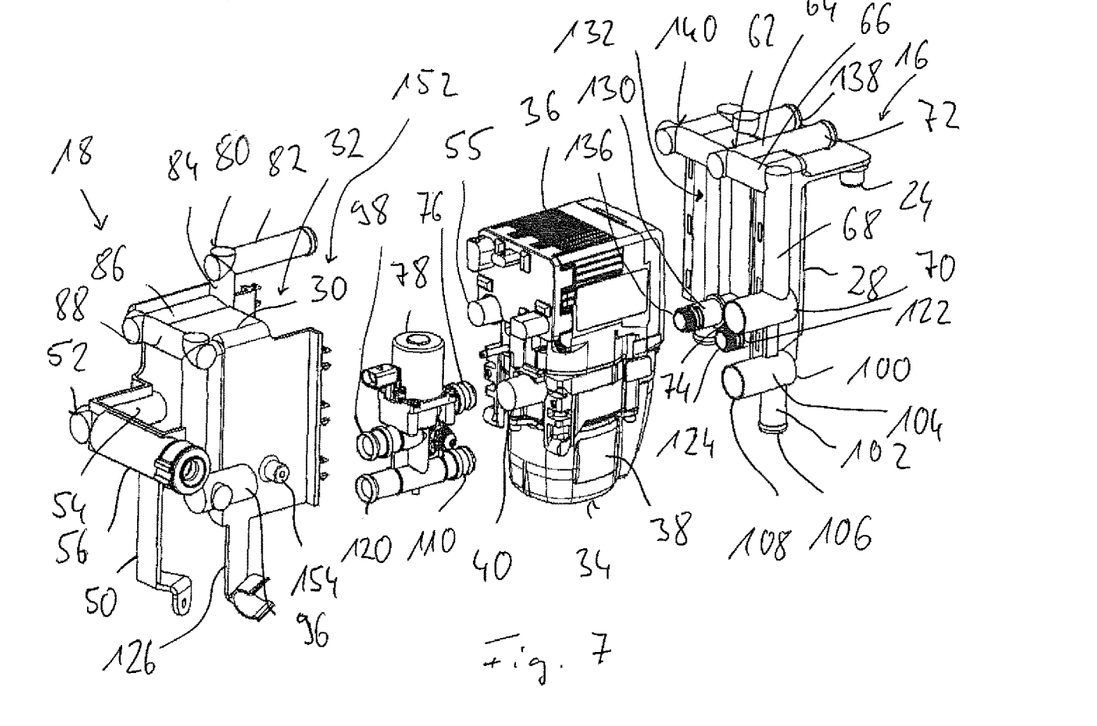
FIG. 7 is an exploded perspective view of the heater carrier device assembly unit according to FIG. 1 with two carrier device modules, with a heater and with an on-off valve.
Figure 8:
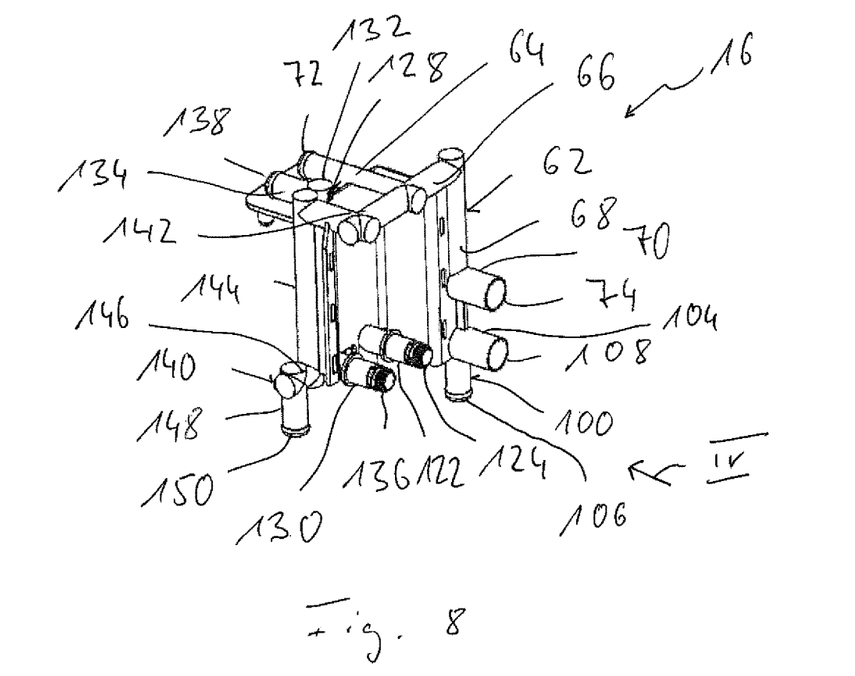
FIG. 8 is a perspective view of a first carrier device module of the heater carrier device assembly unit according to FIG. 1.
Figure 9:
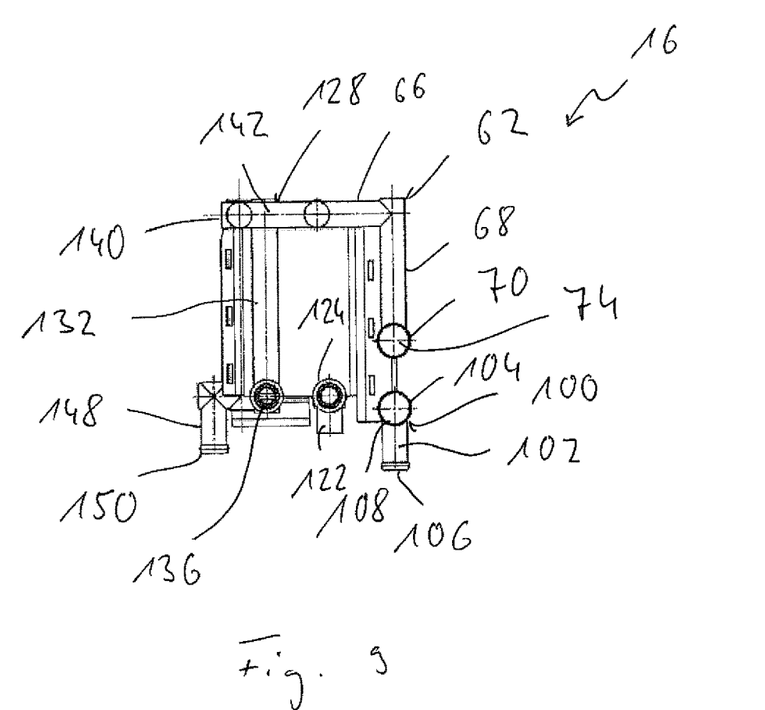
FIG. 9 is a view showing the carrier device module according to FIG. 1, viewed in the viewing direction IX in FIG. 8.
Figure 10:
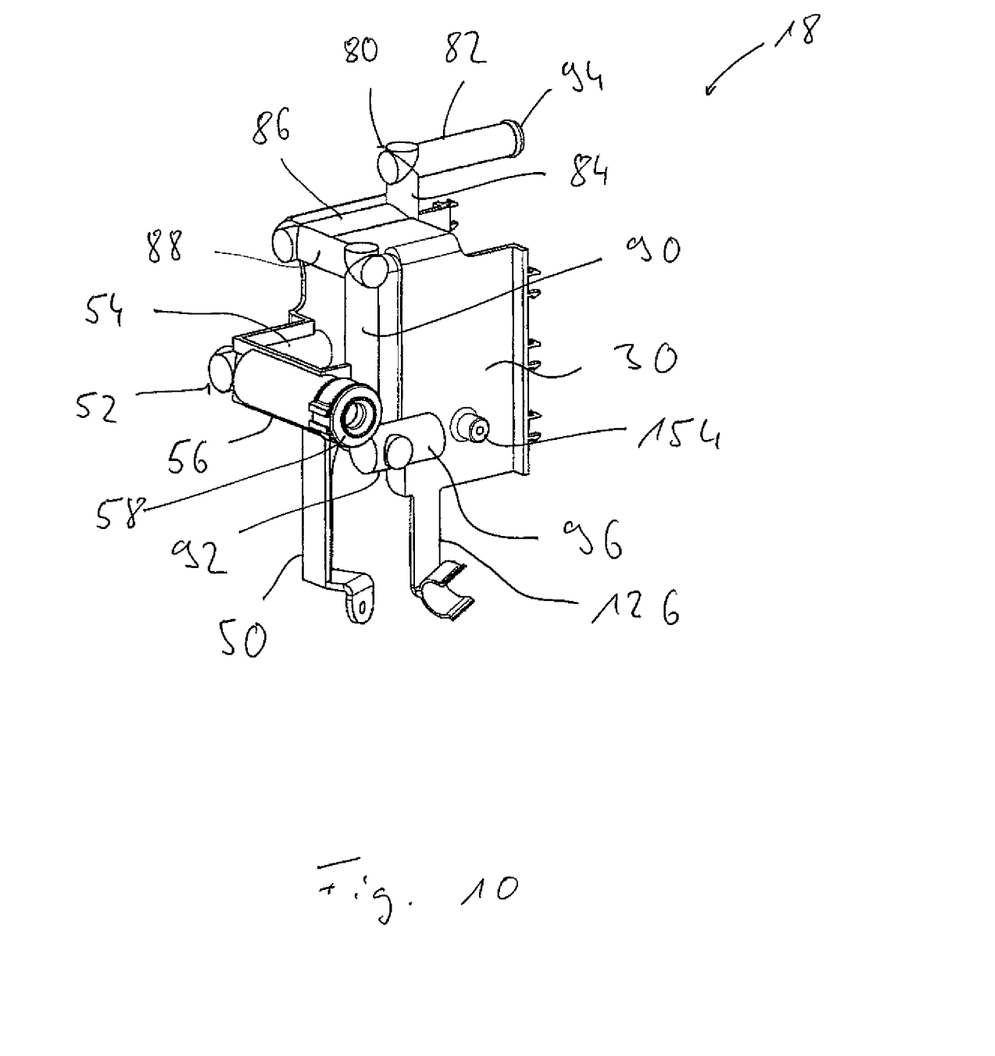
FIG. 10 is a perspective view of a second carrier device module of the heater carrier device assembly unit according to FIG. 1.
Figure 11:
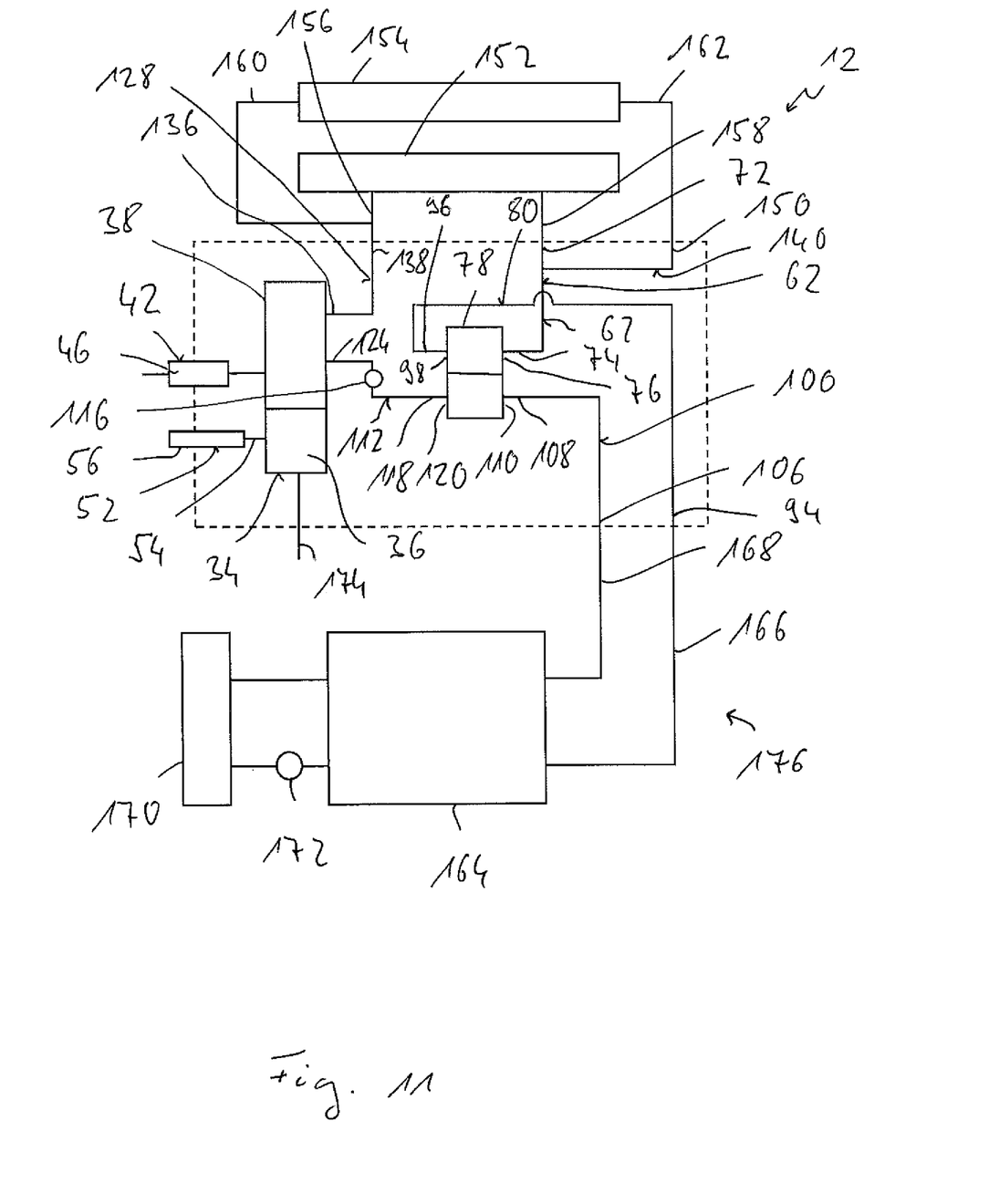
FIG. 11 is a schematic view of the integration of the heater carrier device assembly unit according to FIG. 1 into a heating system for a vehicle.

Referring to the drawings, FIGS. 1 through 7 show a heater carrier device assembly unit or parts thereof, which is generally designated by 10 and which is provided for integration into a heating system generally designated by 12 in FIG. 11 for a vehicle. The heater carrier device assembly unit 10 comprises as an essential component a carrier device, which is generally designated by 14 and which is built with two carrier device modules 16, 18. The two carrier device modules 16, 18 are preferably made of a plastic material and may be manufactured each, for example, in one piece according to a casting method or be composed of a plurality of parts made of a plastic material.

The first carrier device module 16 comprises a mounting area, which is generally designated by 20 and in which the carrier device 14 may be arranged on a vehicle, for example, as a side rail of a vehicle frame or of another assembly unit of the vehicle. The connection may be achieved by screw connection or/and clamping, and decoupling of vibrations can be achieved via preferably flexible decoupling elements 22, 24, 26. The first carrier device module 16 comprises a plate-like module body 28, which has a bent configuration and at which a plurality of sections of line areas provided at the first carrier device module 16, which sections will be described below and which sections are provided at the first carrier device module 16, are carried and provided.

The second carrier device module 18 comprises a, for example, box-shaped module body 30, at which a plurality of line areas are likewise provided and carried. The module body 30 of the second carrier device module 18 may be connected to the module body 28 of the first carrier device module 16, for example, by screw connection, locking or the like, so that a space generally designated by 32 is formed for receiving a preferably fuel-operated heater 34 between the two module bodies 28, 30 or between the two carrier device modules 16, 18.

The heater 34 comprises a burner area 36, which is also shown schematically in FIG. 11 and into which combustion air and fuel are fed, so that combustion waste gases, which flow through a heat exchanger area 38, are formed during combustion taking place in the combustion chamber of the burner area 36. An exhaust system 42 is connected with a pipe section 44 to a waste gas outlet of the heater 34, which outlet is generally designated by 40. The pipe section 44 leads to a muffler 46, from which an outlet pipe 48 leads away. A fastening section 50, at which the exhaust system 42 may be fixed, for example, in the area of its muffler 46, is provided at the second carrier device module 18.

A combustion air line area 52 is provided at the second carrier device module 18. A section 54 of the combustion air line area 52 is connected or is to be connected to a combustion air inlet 55 of a combustion air blower, for example, a side channel blower, of the heater. A section of the combustion air line area 52 connected to the section 54 forms with a muffling material or with, for example, a flow path configured in a meandering manner a muffler area 58, via which the combustion air line area 52 is open towards the surrounding area, so that combustion air can flow over the muffler area 58 or the two sections 56, 54 and the combustion air inlet 55 into the burner area 36 of the heater 34.

The carrier device 14 or the modules 16, 18 thereof further have a heat transfer medium line area generally designated by 60. As will be described below, this is divided between the two carrier device modules 16, 18. For example, a first line area of the heat transfer medium line area 60, which area is generally designated by 62, is thus provided, for example, at the first carrier device module 16. This first line area 62 comprises sections 64, 66, 68, 70. The section 64 forms a first heat transfer medium circuit connection area 72. The section 70 forms a first on-off valve connection area 74. The first line area 62 can be connected with this to a first connection 76 of an on-off valve generally designated by 78. For example, the on-off valve 78 may be pushed with its first connection 76 into the first on-off valve connection area 74 and then mounted in a fluid-tight manner.

A second line area of the heat transfer medium line area 60 generally designated by 80 is provided at the second carrier device module 18. The second line area 80 comprises sections 82, 84, 86, 88, 90, 92. The section 82 forms a second heat transfer medium circuit connection area 94. The section 92 forms a second on-off valve connection area 96, to which a second connection 98 of the on-off valve 78 can be connected in a fluid-tight manner, for example, by insertion.

Further, a third line area 100 of the heat transfer medium line area 60 is provided at the first carrier device module 16. The third line area 100 comprises sections 102, 104. The section 102 forms a third heat transfer medium circuit connection area 106. The section 104 forms a third on-off valve connection area 108, to which a third connection 110 of the on-off valve 78 can be connected in a fluid-tight manner, for example, by insertion.

A fourth line area 112 of the heat transfer medium line area 60 comprises a preferably flexible pipeline 114, into which a heat transfer medium pump 116 is integrated. The flexible pipeline 114 forms a fourth on-off valve connection area 118, which can be connected in a fluid-tight manner to a fourth connection 120 of the on-off valve 78 by plugging same onto said fourth connection 120. A pipe clamp or the like may be used here in order to achieve a stable connection. The flexible pipeline 114 is further connected to a section 112, which is formed at the first carrier device module 16 and which provides a first heat exchanger area connection area 124, via which a connection to the heat exchanger area 38 of the heater 34 is established. For example, the first heat exchanger connection area 122 may be inserted into a corresponding pipe branch of the heat exchanger area 38 in a fluid-tight manner. Just as in the case of the different connections 76, 98, 110, 120 of the on-off valve 78, the fluid-tight connection may be effected, for example, by the interposition of an O-ring-like sealing element or a plurality of such sealing elements. Further, a holding area 126, into which the flexible pipeline 114 can be clamped, is provided at the second carrier device module 18 for holding the flexible pipeline 114 in a stable manner.

Further, a fifth line area 128 of the heat transfer medium line area 60 is provided at the first carrier device module 16. This comprises sections 130, 132, 134. The section 130 forms a second heat exchanger area connection area 136, which can be inserted into a corresponding pipe branch of the heat exchanger area 38 in a fluid-tight manner. The section 134 forms a fourth heat transfer medium circuit connection area 138.

Further, a sixth line area of the heat transfer medium line area 60 generally designated by 140 is provided at the first carrier device module 16. This sixth line area 140 branches off from the section 64 of the first line area 62 and comprises sections 142, 144, 146, 148. The section 148 forms a fifth heat transfer medium connection area 150.

In the assembled state of the heater carrier device assembly unit 10, the heater 34 is mounted between the two carrier device modules 16, 18 of the carrier device 14 and held thereon. The heater 34 may be connected, for example, to at least one of the two carrier device modules 16, 18 by screw connection or/and locking or in another manner. As an alternative or in addition, a carrying interaction holding the heater 34 in a stable manner between the two carrier device modules 16, 18 is achieved by the connection of the different inlets and outlets of the heater 34 to respective connection areas of the different line areas. This means that a carrying area generally designated by 152 is provided for the heater 34 already by these different connection areas or by some of the connection areas to be brought into connection with the heater 34. As an alternative or in addition, this carrying area may also comprise a permanent connection by screw connection, locking or in another manner to at least one of the carrier device modules 16, 18. The on-off valve 78 may, in turn, be connected, for example, to a connection area 154 at the second carrier device module 18, for example, by screw connection or/and locking or the like.

The integration of this heater carrier device assembly unit 10 outlined by dashed lines in FIG. 11 into the heating system 12 or a coolant circuit 176 will be explained below with reference to FIG. 11.

The heating system 12 comprises as essential components two heating heat exchangers 152, 154. These may be accommodated at different positions in a vehicle. A line 156 leading to the heating heat exchanger 152 is connected to the fourth heat transfer medium circuit connection area 138 of the fifth line area 128. A line 158 leading away from the heating heat exchanger 152 is connected to the first heat transfer medium circuit connection area 72 of the first line area 62. A line 160 leading to the heating heat exchanger 154 branches off from the line 156 outside the heater carrier device assembly unit 10. A line 162 leading away from this heating heat exchanger 154 is connected to the fifth heat transfer medium circuit connection area 150 of the sixth line area 140. The two heating heat exchangers 152, 154 are thus connected essentially parallel to one another and the heat transfer medium released from the heat exchanger area 38 of the heater 34, i.e., generally a liquid, thus flows through in parallel.

The second heat transfer medium circuit connection area 94 of the second line area 80 is in connection with a line 166 leading to a water jacket of a drive unit 164, for example, an internal combustion engine. A line 168 leading away from the drive unit 164 is connected to the third heat transfer medium connection area 106 of the third line area 100.

Further, a cooler heat exchanger 170 may be associated with the drive unit 164. This heat exchanger 170 may be switched on and off in a controlled manner, for example, by a thermostat valve 172, in order to be able to release heat when needed via this cooler heat exchanger 170 to the outside.

A fuel feed line 174, which feeds, for example, liquid fuel into the burner area 36 of the heater 34, is further seen in FIG. 11 in a schematic view. Further, the heater 34 is connected, of course, for example, to an onboard power supply system via different lines contacting this heater 34 electrically, in order to supply the heater 34 with electric energy and optionally with information relevant for the operation thereof.

The on-off valve 78 may be set, on the one hand, during the operation of the heating system 12 shown in FIG. 11 such that there is a line connection between the first connection 76 and the second connection 98 and there is a line connection between the third connection 110 and the fourths connection 120. The heat transfer medium being carried through the heat transfer medium pump 116 then flows, for example, via the line 168, coming from the drive unit 164, through the on-off valve 78 and through the heat exchanger area 38 to the two heating heat exchangers 152, 154. The heat transfer medium flowing back from these enters via the heat transfer medium circuit connection areas 72, 150 the first line area 62 and through the on-off valve 78 the second line area and flows to the line 166, through which the heat transfer medium flows again black to the drive unit 164. On the one hand, heat generated in the heater 34 can thus be transferred via the two heating heat exchangers 152, 154 to the air to be introduced, for example, into an interior of the vehicle. Further, heat being transported in the heat transfer medium can be transferred to the drive unit 164 in order to preheat this, for example, before putting into operation. Further, the heat transfer medium not heated additionally in the heater 34 in this state of the on-off valve 78 with the heater 34 deactivated will likewise flow through the drive unit 164 and the two heating heat exchangers 152, 154 in order to transfer heat provided in the drive unit 164, e.g., to the air to be introduced into the interior of a vehicle.

In a second switching state of the on-off valve 78, this valve may establish a connection between the first connection 76 and the fourth connection 120 as well as a connection between the third connection 110 and the second connection 98. The drive unit 164 is decoupled in this state from the heater 34 and also from the two heating exchangers 152, 154. The heater 34 is, in turn, exclusively in connection with the two heating heat exchangers 152, 154. Heat generated by the heater 34 is consequently transferred in this state only in the area of the heating heat exchanger 152, 154, for example, to the air to be introduced into the interior of a vehicle. The drive unit 164 is not in a thermal interaction with the heater 34. This state can be selected if, for example, preference shall be given to the preheating of the interior of the vehicle.

It should finally be noted that many different modifications may be made, of course, especially on the heating system shown in FIG. 11. It is thus possible to provide, for example, only a single heating heat exchanger, or more than two heating heat exchangers may be provided. Similarly to the sixth line area, a seventh line area may be provided in association with the third line area in order to provide a branching off to the second heating heat exchanger already within the heater carrier device assembly unit.

A simple, yet stable integration of a heater into a vehicle is made possible with the configuration according to the present invention of a carrier device or of a heater carrier device assembly unit comprising this, and the possibility of a simple connection of an assembly unit thus configured especially to the heat transfer medium circuit of a vehicle can also be achieved based on the provision of different line areas at the carrier device. Preassembly of flexible tube connections can thus be eliminated. In particular, the different heat transfer medium connections may be configured as so-called quick connector connections, which make possible a simple coupling of the different lines of the heat transfer medium circuit to the heater carrier device assembly unit. Due to the use of plastic material as the essential material used for manufacture, a stable, yet lightweight configuration can be obtained. A thermal overload is avoided, because the heat transfer medium to be sent into the different line areas will not generally exceed a temperature of about 120° C. and since the combustion waste gases are removed from the assembly unit via a separately configured exhaust system.

While specific embodiments of the invention have been shown and described in detail to illustrate the application of the principles of the invention, it will be understood that the invention may be embodied otherwise without departing from such principles.

What is claimed is:

1. A carrier device for mounting a fuel-operated heater on a vehicle, the carrier device comprising:
    a mounting area for mounting the carrier device on a vehicle;
    a carrying area for mounting a fuel-operated heater on the carrier device; and
    at least one fluid line area for conveying fluid to and from the fuel-operated heater, the at least one fluid line area comprising:
    a combustion air line area for sending combustion air to a combustion air inlet of the fuel-operated heater;
    a heat transfer medium line area for sending heat transfer medium flowing in a heat transfer medium circuit of the vehicle through the carrier device and for sending heat transfer medium to and from a heat exchanger area of the fuel-operated heater;
    wherein the heat transfer medium line area comprises:
    a first line area with a first heat transfer medium circuit connection area arranged for being connected to the heat transfer medium circuit and with a first on-off valve connection area arranged for being connected to a first connection of an on-off valve;
    a second line area with a second heat transfer medium circuit connection area arranged for being connected to the heat transfer medium circuit and with a second on-off valve connection area arranged for being connected to a second connection of the on-off valve;
    a third line area with a third heat transfer medium circuit connection area arranged for being connected to the heat transfer medium circuit and with a third on-off valve connection area arranged for being connected to a third connection of the on-off valve;
    a fourth line area with a first heat exchanger area arranged for being connected to the heat exchanger area and with a fourth on-off valve connection area arranged for being connected to a fourth connection of the on-off valve; and a fifth line area with a second heat exchanger area connection area arranged for being connected to the heat exchanger area and with a fourth heat transfer medium circuit connection area arranged for being connected to the heat transfer medium circuit.

2. A carrier device in accordance with claim 1, wherein the combustion air line area comprises a combustion air connection area to be connected to the combustion air inlet of the heater and a muffler area upstream of the combustion air connection area.

3. A carrier device in accordance with claim 1, wherein the heat transfer medium line area further comprises a sixth line area that is in connection with the first line area and with a fifth heat transfer medium circuit connection area to be connected to the heat transfer medium.

4. A carrier device in accordance with claim 1, wherein:
at least a first carrier device module and a second carrier device module are provided;
the mounting area is provided on the first carrier device module; and
the carrying area is provided on the first carrier device module or on the second carrier device module or the carrying area is provided on both the first carrier device module and on the second carrier device module.

5. A carrier device in accordance with claim 4, wherein at least one of the first carrier device module and the carrier device module is made at least partially of a plastic material.

6. A carrier device in accordance with claim 4, wherein the combustion air feed line area is provided at the second carrier device module.

7. A carrier device in accordance with claim 4, wherein the first carrier device module and the second carrier device module enclose a heater mounting space.

8. A carrier device in accordance with claim 1, wherein:
at least a first carrier device module and a second carrier device module are provided;
the mounting area is provided on the first carrier device module;
the carrying area is provided on the first carrier device module or on the second carrier device module or the carrying area is provided on both the first carrier device module and on the second carrier device module; and
the first line area and/or the third line area and/or the fourth line area and/or the fifth line area and/or the sixth line area is provided at the first carrier device module.

9. A carrier device in accordance with claim 1, wherein:
at least a first carrier device module and a second carrier device module are provided;
the mounting area is provided on the first carrier device module; and
the carrying area is provided on the first carrier device module or on the second carrier device module or the carrying area is provided on both the first carrier device module and on the second carrier device module;
the second line area is provided at the second carrier device module.

10. A carrier device in accordance with claim 1, wherein the carrying area comprises at least one heat exchanger area connection area of the heat transfer medium line area and a combustion air connection area of the combustion air line area.

11. A heater carrier device assembly unit for a vehicle, the heater carrier device assembly unit comprising:
a fuel-operated heater having a heat exchanger area;
an on-off valve having a first connection, a second connection, a third connection and a fourth connection; and
a carrier device comprising:
a mounting area for mounting the carrier device on a vehicle;
a carrying area for mounting a fuel-operated heater on the carrier device; and
at least one fluid line area for conveying fluid to and from the fuel-operated heater, the at least one fluid line area comprising:
a combustion air line area for sending combustion air to a combustion air inlet of the fuel-operated heater;
a heat transfer medium line area for sending heat transfer medium flowing in a heat transfer medium circuit of the vehicle through the carrier device and/or for sending heat transfer medium to and from the heat exchanger area of the fuel-operated heater;
wherein the heat transfer medium line area comprises:
a first line area with a first heat transfer medium circuit connection area arranged for being connected to the heat transfer medium circuit and with a first on-off valve connection area connected to the first connection of the on-off valve;
a second line area with a second heat transfer medium circuit connection area arranged for being connected to the heat transfer medium circuit and with a second on-off valve connection area connected to the second connection of the on-off valve;
a third line area with a third heat transfer medium circuit connection area arranged for being connected to the heat transfer medium circuit and with a third on-off valve connection area connected to the third connection of the on-off valve;
a fourth line area with a first heat exchanger area connection area connected to the heat exchanger area and with a fourth on-off valve connection area connected to the fourth connection of the on-off valve by a flexible line connection; and
a fifth line area with a second heat exchanger area connection area connected to the heat exchanger area and with a fourth heat transfer medium circuit connection area arranged for being connected to the heat transfer medium circuit.

12. A heater carrier device assembly unit in accordance with claim 11, wherein the flexible line connection comprises a heat transfer medium pump.

13. A heater carrier device assembly unit in accordance with claim 11, wherein an exhaust system connected to a waste gas outlet of the heater is carried on the carrier device.

14. A heating system for a vehicle, comprising:
a heat transfer medium circuit with at least one heating heat exchanger and with at least one drive unit; and
a heater carrier device assembly unit for a vehicle, the heater carrier device assembly unit comprising:
a fuel-operated heater having a heat exchanger area; and
a carrier device comprising:
a mounting area for mounting the carrier device on a vehicle;
a carrying area for mounting the fuel-operated heater on the carrier device; and
at least one fluid line area for conveying fluid to and from the fuel-operated heater, the at least one fluid line area comprising:
a combustion air line area for sending combustion air to a combustion air inlet of the fuel-operated heater;
a heat transfer medium line area for sending heat transfer medium flowing in a heat transfer medium circuit of the vehicle through the carrier device and for sending heat transfer medium to and from the heat exchanger area of the fuel-operated heater;

an on-off valve having a first connection, a second connection, a third connection and a fourth connection;

at least a first carrier device module and a second carrier device module;

wherein:

the mounting area is provided on the first carrier device module;

the carrying area is provided on the first carrier device module or on the second carrier device module or the carrying area is provided on both the first carrier device module and on the second carrier device module;

the combustion air line area comprises a combustion air connection area to be connected to the combustion air inlet of the heater and a muffler area upstream of the combustion air connection area;

the heat transfer medium line area comprises:

a first line area with a first heat transfer medium circuit connection area connected to the heat transfer medium circuit and with a first on-off valve connection area connected to the first connection of the on-off valve;

a second line area with a second heat transfer medium circuit connection area connected to the heat transfer medium circuit and with a second on-off valve connection area connected to the second connection of the on-off valve;

a third line area with a third heat transfer medium circuit connection area connected to the heat transfer medium circuit and with a third on-off valve connection area connected to the third connection of the on-off valve;

a fourth line area with a first heat exchanger area connected to the heat exchanger area and with a fourth on-off valve connection area connected to the fourth connection of the on-off valve; and a fifth line area with a second heat exchanger area connection area connected to the heat exchanger area and with a fourth heat transfer medium circuit connection area connected to the heat transfer medium circuit.

* * * * *